US010686810B1

(12) United States Patent
Ahmed et al.

(10) Patent No.: US 10,686,810 B1
(45) Date of Patent: Jun. 16, 2020

(54) SYSTEMS AND METHODS FOR PROVIDING SECURITY IN POWER SYSTEMS

(71) Applicants: Ahmed Aly Saad Ahmed, Miami, FL (US); Samy Gamal Faddel Mohamed, Miami, FL (US); Osama Mohammed, Miami, FL (US)

(72) Inventors: Ahmed Aly Saad Ahmed, Miami, FL (US); Samy Gamal Faddel Mohamed, Miami, FL (US); Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/782,638

(22) Filed: Feb. 5, 2020

(51) Int. Cl.
| H04L 29/06 | (2006.01) |
| H04L 12/24 | (2006.01) |
| G06K 9/62 | (2006.01) |
| G01R 31/08 | (2020.01) |

(52) U.S. Cl.
CPC ...... *H04L 63/1416* (2013.01); *H04L 41/0631* (2013.01); *H04L 63/20* (2013.01); *G01R 31/08* (2013.01); *G01R 31/086* (2013.01); *G06K 9/6298* (2013.01); *Y04S 40/166* (2013.01); *Y04S 40/24* (2013.01)

(58) Field of Classification Search
None
See application file for complete search history.

(56) References Cited

U.S. PATENT DOCUMENTS

| 9,615,269 | B2* | 4/2017 | Henry | G01R 31/58 |
| 10,564,247 | B2* | 2/2020 | Guzman-Casillas | |
| | | | | G01R 35/00 |
| 2004/0193329 | A1* | 9/2004 | Ransom | H04L 63/20 |
| | | | | 700/286 |
| 2009/0299542 | A1* | 12/2009 | Nuqui | H04L 63/1441 |
| | | | | 700/297 |
| 2011/0288692 | A1* | 11/2011 | Scott | G06F 21/55 |
| | | | | 700/297 |
| 2012/0266209 | A1* | 10/2012 | Gooding | H04L 63/20 |
| | | | | 726/1 |
| 2013/0003238 | A1* | 1/2013 | Bush | G06Q 50/06 |
| | | | | 361/64 |

(Continued)

OTHER PUBLICATIONS

Saad et al.; Modeling and testing of multi-resolution morphological gradient distance relay algorithm; 2011; retrieved from the Internet https://www.sciencedirect.com/science/article/pii/S1876610211043451; pp. 1-9, as printed. (Year: 2011).*

(Continued)

*Primary Examiner* — Saleh Najjar
*Assistant Examiner* — Michael W Chao
(74) *Attorney, Agent, or Firm* — Saliwanchik, Lloyd & Eisenschenk

(57) ABSTRACT

Systems and methods for security in power systems are provided. A security-aware distributed control framework for resilient operation of power systems can detect and mitigate different types of attacks that might target power systems. The framework can discover a change in the features of transmitted data from neighbor agents, discard an infected agent, and achieve an updated consensus protocol agreement while satisfying a control system objective.

20 Claims, 8 Drawing Sheets

(56) References Cited

U.S. PATENT DOCUMENTS

| | | | | |
|---|---|---|---|---|
| 2013/0054162 A1* | 2/2013 | Smith | .................. | H02J 3/00 |
| | | | | 702/59 |
| 2013/0193766 A1* | 8/2013 | Irwin | .................. | H02H 7/268 |
| | | | | 307/82 |
| 2013/0221977 A1* | 8/2013 | Ukil | .................. | H02H 3/081 |
| | | | | 324/522 |
| 2014/0058689 A1* | 2/2014 | Klien | .................. | H04L 63/14 |
| | | | | 702/60 |
| 2016/0124031 A1* | 5/2016 | Morsi Ibrahim | .. | G01R 19/2513 |
| | | | | 702/58 |
| 2016/0366586 A1* | 12/2016 | Gross | .................. | H04W 12/06 |
| 2017/0093889 A1* | 3/2017 | McEachern | ......... | H04L 63/1441 |
| 2017/0307676 A1* | 10/2017 | Gaouda | .................. | G01R 31/50 |
| 2018/0115561 A1* | 4/2018 | Sun | .................. | H02J 13/00001 |
| 2018/0262525 A1* | 9/2018 | Yan | .................. | G06N 20/00 |

OTHER PUBLICATIONS

Zhu et al.; Detection and Classification of Power Disturbances Using Mathematical Morphology . . . ; 2014; retrieved from the Internet https://ieeexplore.ieee.org/abstract/document/7028808 ; pp. 1-6, as printed. (Year: 2014).*

* cited by examiner

SYSTEMS AND METHODS FOR PROVIDING SECURITY IN POWER SYSTEMS

BACKGROUND

Power system control and management architectures are typically built based on centralized algorithms. The future growth of distributed energy resources (DERs) deployment encourages the power system to depend mainly on distributed control/management algorithms. A main drawback of distributed algorithms is their dependence on limited peer-to-peer information broadcast. Each controller or manager is implemented locally to satisfy certain local objectives and is limited with respect to any global objective, which is transmitted by only the information from its neighbors. While the local objective can be satisfying local energy balance, stabilizing local voltage, or maximizing local profits, the global objective may be equal power sharing among different DERs, voltage stabilization at the point of common coupling (PCC), or synchronizing distributed energy entities.

BRIEF SUMMARY

Embodiments of the subject invention provide novel and advantageous systems and methods for security in power systems. A security-aware distributed control framework for resilient operation of power systems can detect and mitigate different types of attacks that might target power systems. The framework is fast, reliable, and scalable and is able to capture cyber system dynamical features and discriminate between a normal change in control law (cyber system behavior) and a malicious control agent (attacker behavior). The framework can discover a change in features of transmitted data from neighbor agents, discard an infected agent, and achieve an updated consensus protocol agreement while satisfying a control system objective. The framework is able to detect any type of attack that compromises data availability and/or integrity, including false data injection attacks, jamming attacks, and denial of service attacks.

In an embodiment, a framework for providing security in a power system can comprise: a processor and a (non-transitory) machine-readable medium (e.g., a (non-transitory) computer-readable medium) in operable communication with the processor and having instructions stored thereon that, when executed by the processor, perform the following steps: receive incoming information states from agents of the power system; analyze the incoming information states using a first level of a multi-resolution morphological gradient algorithm (MMGA); calculate a first resolution multi-resolution morphological gradient (MMG) based on the incoming information states; compare an absolute value of the first resolution MMG to a first threshold and, if the absolute value of the first resolution MMG exceeds the first threshold, trigger an attack alarm that the power system has an infected agent; if the attack alarm is triggered, calculate a second resolution MMG based on the incoming information states; compare an absolute value of the second resolution MMG to a second threshold to identify which of the agents of the power system is the infected agent; set all weighting factors of the infected agent to zero to exclude the infected agent; and update a state of the agents of the power system with the infected agent excluded. The analyzing of the incoming information states using the first level of the MMGA can comprise calculating dilation and erosion processes of the incoming information states by finding a maximum number of delayed samples and a minimum number of delayed samples of the incoming information states. A quantity of the delayed samples can be dependent upon a rate of information exchange between the agents of the power system. The calculating of the first resolution MMG can comprise subtracting a dilated signal from an eroded signal. The second threshold can be greater than the first threshold. Each of the first threshold and the second threshold can be based on a topology of a communication graph between the agents of the power system. The power system can comprise at least one of a nanogrid, a microgrid, and a power system area. The power system can comprise any reasonable number of agents (e.g., 5, 10, 20, at least 5, at least 10, at least 20, or more).

In another embodiment, a method for providing security in a power system can comprise: receiving (e.g., by a processor) incoming information states from agents of the power system; analyzing (e.g., by the processor) the incoming information states using a first level of an MMGA; calculating (e.g., by the processor) a first resolution MMG based on the incoming information states; comparing (e.g., by the processor) an absolute value of the first resolution MMG to a first threshold and, if the absolute value of the first resolution MMG exceeds the first threshold, trigger an attack alarm that the power system has an infected agent; if the attack alarm is triggered, calculating (e.g., by the processor) a second resolution MMG based on the incoming information states; comparing (e.g., by the processor) an absolute value of the second resolution MMG to a second threshold to identify which of the agents of the power system is the infected agent; setting (e.g., by the processor) all weighting factors of the infected agent to zero to exclude the infected agent; and updating (e.g., by the processor) a state of the agents of the power system with the infected agent excluded.

BRIEF DESCRIPTION OF THE DRAWINGS

FIG. 6(a) shows results for five agents; FIG. 6(b) shows results for ten agents; and FIG. 6(c) shows results for 20 agents.

DETAILED DESCRIPTION

Embodiments of the subject invention provide novel and advantageous systems and methods for security in power systems. A security-aware distributed control framework for resilient operation of power systems can detect and mitigate different types of attacks that might target power systems. The framework is fast, reliable, and scalable and is able to capture cyber system dynamical features and discriminate between a normal change in control law (cyber system behavior) and a malicious control agent (attacker behavior). The framework can discover a change in features of transmitted data from neighbor agents, discard an infected agent, and achieve an updated consensus protocol agreement while satisfying a control system objective. The framework is able to detect any type of attack that compromises data availability and/or integrity, including false data injection attacks, jamming attacks, and denial of service attacks.

Distributed control systems (DCSs) use local measurements of each agent and its correlated neighbors to estimate its new control/management objective. To estimate the updated control law, a consensus algorithm is utilized. A single attack on the control agent itself or its communication links can significantly disturb the distributed algorithm effectiveness. The consensus algorithm (protocol) aims to make the distributed control/management agents reach an agreement on a transmitted message if there is a central authority (leader) or reach an agreement on an average quantity if the system is fully distributed.

DCSs and their associated communication system are a cyber system and can be described by graph theory in terms of the graph Laplacian matrix formulation. The cyber communication system can be represented by a directed graph $\mathcal{G}(\mathcal{V}, E)$ that contains $\mathcal{V}$ nodes and a set of directed edges $\varepsilon$. The connection strength between the nodes can be represented by the graph adjacency matrix $A=[a_{ij}]$ and weighting factors of the connection can be described as follows:

$$[A] = \begin{cases} 1 & \text{if } i \rightarrow j \in \varepsilon \\ 0 & \text{otherwise} \end{cases} \quad (1)$$

The graph degree of the in-neighbors can be represented by $D=\text{diag}\{d_{ij}\}$. The consensus is reached by solving the cyber system, which can be represented by the Laplacian matrix $\mathcal{L}=D-A$. In the networked DCS, an agent can be selected to be the leader. The leader has the control law $x_{rule}$ from the higher control level or the system operator. The leader has a reachable path to all other agents (followers). Each node has a state $x_i$ and it can be represented as the following control law $$\dot{x}_i = \sum_{j \in n} a_{ij}(x_j - x_i) + b_i(q - x_i) \quad (2)$$

$$\dot{x} = -(\mathcal{L}+B) \cdot x + B\underline{1}x_{rule} \quad (3)$$

where $B=\text{diag}\{b_i\}$ represents the pinning matrix, and $b_i$ is the weight of the edge between the leader and the upper control level.

Figure 1:
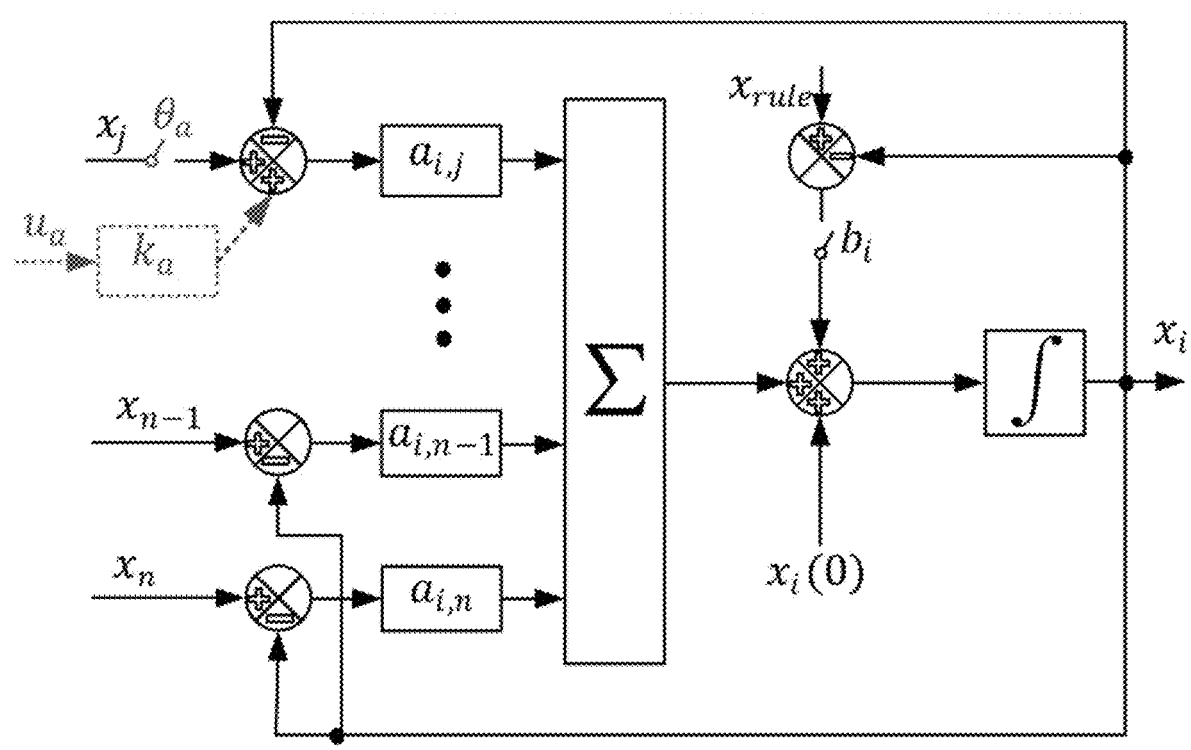
FIG. 1 is a schematic view of a consensus algorithm with an attack model.

FIG. 1 is a schematic view of the consensus algorithm with an attack model, which is represented by Equations (1)-(3). The estimation of $x_i$ is based on the local initial condition $x_1(0)$ and the agent's neighbors $x_j$. The effect of the $j^{th}$ agents can be included ($a_{ij}=1$) or excluded ($a_{ij}=0$) according to the connection features. In addition, the attack on the consensus algorithm can be represented by $\theta_a$ (denial of service attack) and $u_a, k_a$ (false data injection attack).

When a change in the control law is initiated, it propagates from the leader to the rest of the cyber system according to the graph dynamical behavior. This behavior depends on the leader location, the number of control agents, the communication topology between the agents, and the information flow direction in the cyber system. Therefore, the propagation of the information dynamical features in case of normal control objective change is totally different as compared with the dynamical feature of any malicious behavior, such as a communication failure or an attack. The attacker can intentionally change the transmitted data between the distributed agents, which causes failure in the vital control objective.

Mathematically, the consensus algorithm is designed to make all agents reach an agreement cooperatively on $x_{rule}$. Let $b_1 \neq 0$, then $(\mathcal{L}+B)$ is non-singular with positive eigenvalues $\lambda$, and $-(\mathcal{L}+B)$ is asymptotically stable. Consequently, the dynamical consensus response can be derived by solving the first order differential Equation (3) as follows:

$$x(t)=r(0) \cdot e^{-(\mathcal{L}+B)t} + x_{rule} \quad (4)$$

The dynamics of the change in the control/management objective has the feature $e^{-(\mathcal{L}+B)t}$. If a node i is infected by attack vector $U_a=\theta_a+k_a u_a$ at time $t_a$, the dynamical behavior of the infected node changes by $\psi$, and the new solution with the attack is represented as follows:

$$x(t)=x(0) \cdot e^{(-(\mathcal{L}+B)+\psi)t} + x_{rule} + U_a(t) \quad (5)$$

Due to the attack, the new dynamical feature can be detected by studying the change in dynamics, which is represented by $e^{(-(\mathcal{L}+B)+\psi)t}$. Therefore, a signal processing tool can be used to extract the cyber system dynamical feature.

The mathematical morphology (MM) is a signal processing tool that is used in image processing and can be utilized to extract the features from a signal. MM has many morphological operators, and the essential operators are the dilation and the erosion processes. To extract the features of a dynamical change in a signal, a special operator called multi-resolution morphological gradient algorithm (MMGA) can be utilized.

The MMGA is calculated by subtracting the dilated signal and the eroded signal, which suppresses the vital feature in a signal. Mathematically, the dilation and the erosion operators of the signal f by the structuring element g that lies in the domains $D_f, D_g$ are formulated as follows:

$$(f \oplus g)(k) = \max\{f(k+s) + g(s) \mid (k+s) \in D_f, s \in D_g\} \quad (6)$$

$$(f \ominus g)(k) = \min\{f(k+s) + g(s) \mid (k+s) \in D_f, s \in D_g\} \quad (7)$$

where k and s are the sampling constants of the processed signal and the structuring element, respectively.

The multi-resolution morphological gradient in $w^{th}$ resolution levels can be formulated as follows:

$$\nabla_i^w = (f \oplus g)^w - (f \ominus g)^w \quad (8)$$

The resolution level that is used to extract the cyber system features is w=2. The resolution levels are almost zero during steady state. In the case of the dynamical change, the two levels will increase according to the dynamical nature of the change.

Figure 2:
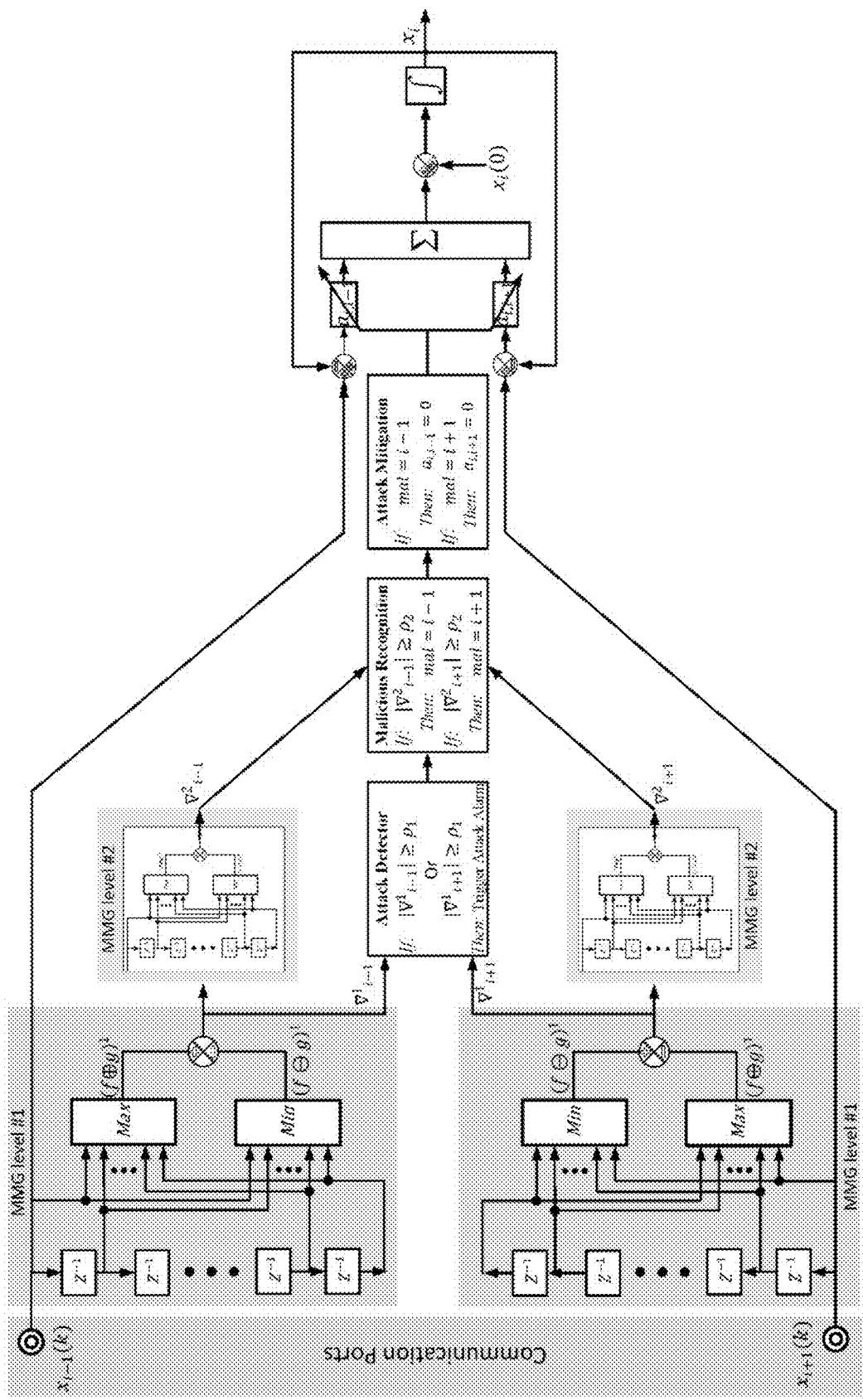
FIG. 2 is a schematic view of a security-aware distributed control/management system, according to an embodiment of the subject invention.

In order to capture the cyber dynamical features for the incoming information to each agent in the cyber graph, embodiments of the subject invention can use a security distributed observer (SDO). The SDO analyzes transmitted information from neighbors using the MMGA, and the results are then checked against pre-selected thresholds to detect, identify, and mitigate any attack(s). FIG. 2 shows a schematic view of a security-aware distributed control/management system, according to an embodiment of the subject invention. FIG. 2 includes an SDO on top of the consensus algorithm to accept only the healthy data of the neighbors. The system depicted in FIG. 2 assumes that the protected control agent has two neighbors; extra neighbor agents would require one or more extra SDOs.

First, the incoming information states $x_{i-1}, x_{i+1}$ are analyzed by the first level of multi-resolution morphological gradient (MMG). The dilation and erosion processes can be calculated by finding the maximum and minimum of a number of delayed samples according to Equations (6) and (7). Then, the first resolution can be calculated by subtracting the dilated signal from the eroded signal according to Equation (8). The first resolution MMG can declare only that there is a change in the cyber system dynamical features as compared to healthy changes. For both communication ports, the absolute values of the resulted first resolutions $\nabla_{i-1}^1, \nabla_{i+1}^1$ can be compared to a threshold $\rho_1$. If any of them exceeds the threshold value, an attack alarm is triggered to give an alert that the cyber system has an infected agent. This trigger launches the calculation process for the second MMG resolution levels $\nabla_{i-1}^2, \nabla_{i+1}^2$, which strengthen the recognition of features of the bad behavior in the cyber system dynamics, to accurately recognize the attacked neighbor agent. After that, the absolute values of the second MMG levels are compared to another threshold $\rho_2$ to identify the malicious control agent. Finally, the attack mitigation is done by excluding the malicious agent from the graph by setting the malicious weighting factors ($a_{i,i-1}$ or $a_{i,i+1}$) to zero (that is, the weighting factor(s) of the malicious agent are set to zero). By excluding the infected agent, the updated state of the $i^{th}$ control agent will follow the leader control/management objective and the full agreement will be retrofitted among the healthy agents.

In many embodiments, $\rho_2 > \rho_1$, and their values can be close to zero. The selection of the two thresholds mainly depends on the communication graph topology and the rate of the information exchange. The quantity of delayed samples in the two resolutions of the MMGA depends on the rate of the information exchange.

In any energy cyber-physical system (e.g., a nanogrid, microgrid, or a power system area), three layers of the control system can be implemented according to the control objective. The first level is the primary control layer, and this level is typically embedded in the local physical system. The secondary control/management system, which can be the focus of systems and methods of embodiments of the subject invention, can be implemented as a distributed algorithm to satisfy the global objective. The third layer is the tertiary control system, and it supports the secondary distributed system by a centric insight (higher authority), which is required to achieve the overall system objective or ensure certain operational policy.

Figure 3:
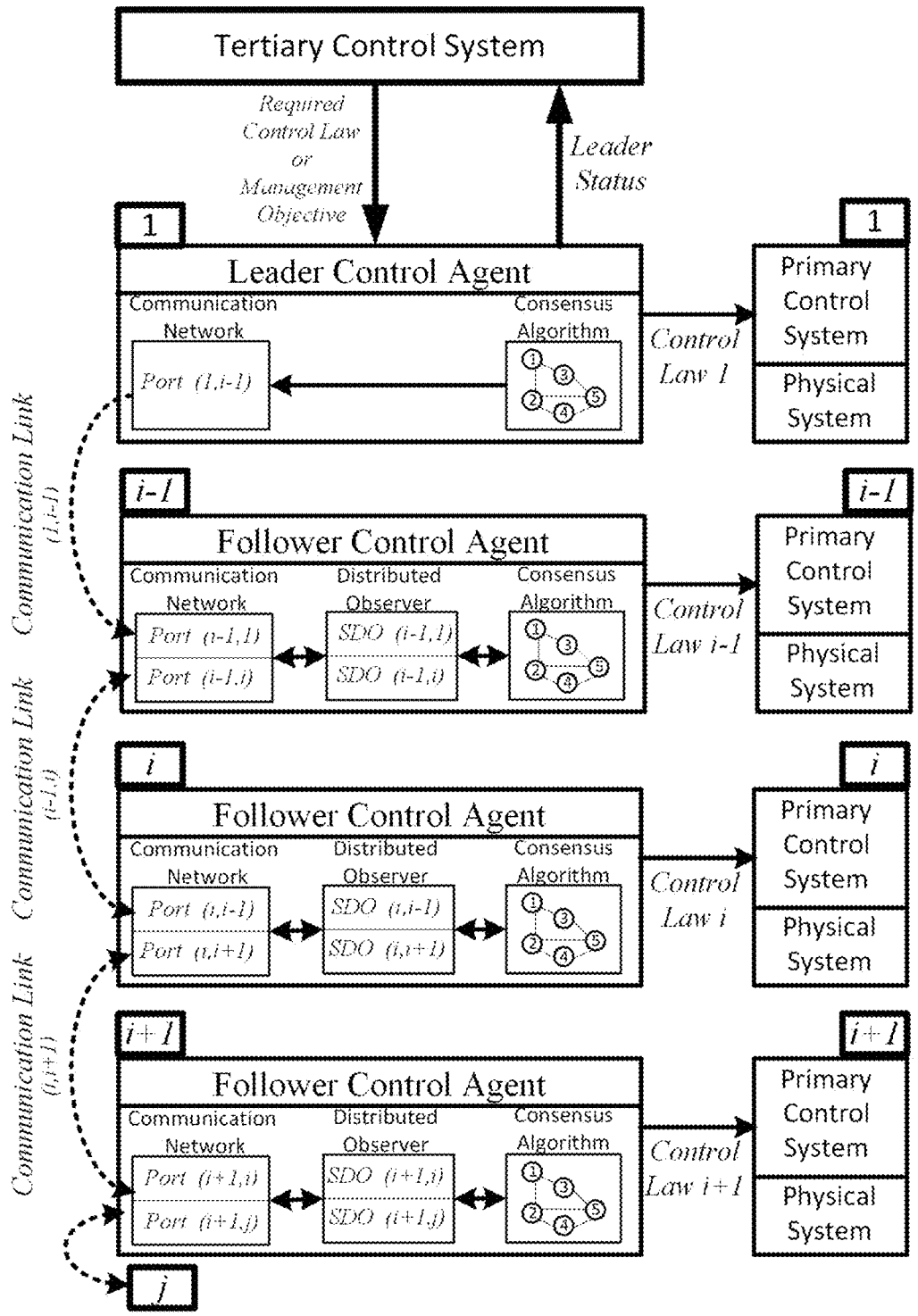
FIG. 3 is a schematic view of security distributed observer (SDO) mapping in an interconnected energy cyber-physical system.

FIG. 3 is a schematic view showing mapping of an SDO in an interconnected energy cyber-physical system, according to an embodiment of the subject invention, to create an integrated security-aware distributed control/management system. Referring to FIG. 3, the tertiary control/management system can send the required control law or the management objective to the distributed system leader (i.e., agent 1) to achieve the global objective. The leader follows the required control law by sending the secondary control command to the primary control layer.

The follower control agent i-1 can have two communication ports to receive its information from its neighbors (the leader and agent i). The SDO can be applied for the two incoming information to modify the consensus algorithm. Then, the final control command can be sent to the primary control system. These processes can be repeated for the follower agents i, i+1, . . . , j.

Security-aware distributed control systems of embodiments of the subject invention can be utilized in any interconnected energy cyber-physical system that has interconnected power systems, including but not necessarily limited to microgrids, nanogrids, distributed energy resources (DERs), energy storage systems, generators, and power system areas. They can be applied to multiple control/management objectives, including but not necessarily limited to frequency control, voltage control, optimal power flow, power-sharing, reactive power control, load frequency control, and power system optimization. In addition, systems of embodiments of the subject invention can deal with multiple attack types, including but not necessarily limited to denial of service, false data injection attack, delay attack, and man in the middle attack. Unlike information technology (IT) security solutions, such as data encryption and authentication, systems of embodiments of the subject invention have situational awareness of attacks and/or bad data.

Figure 7:
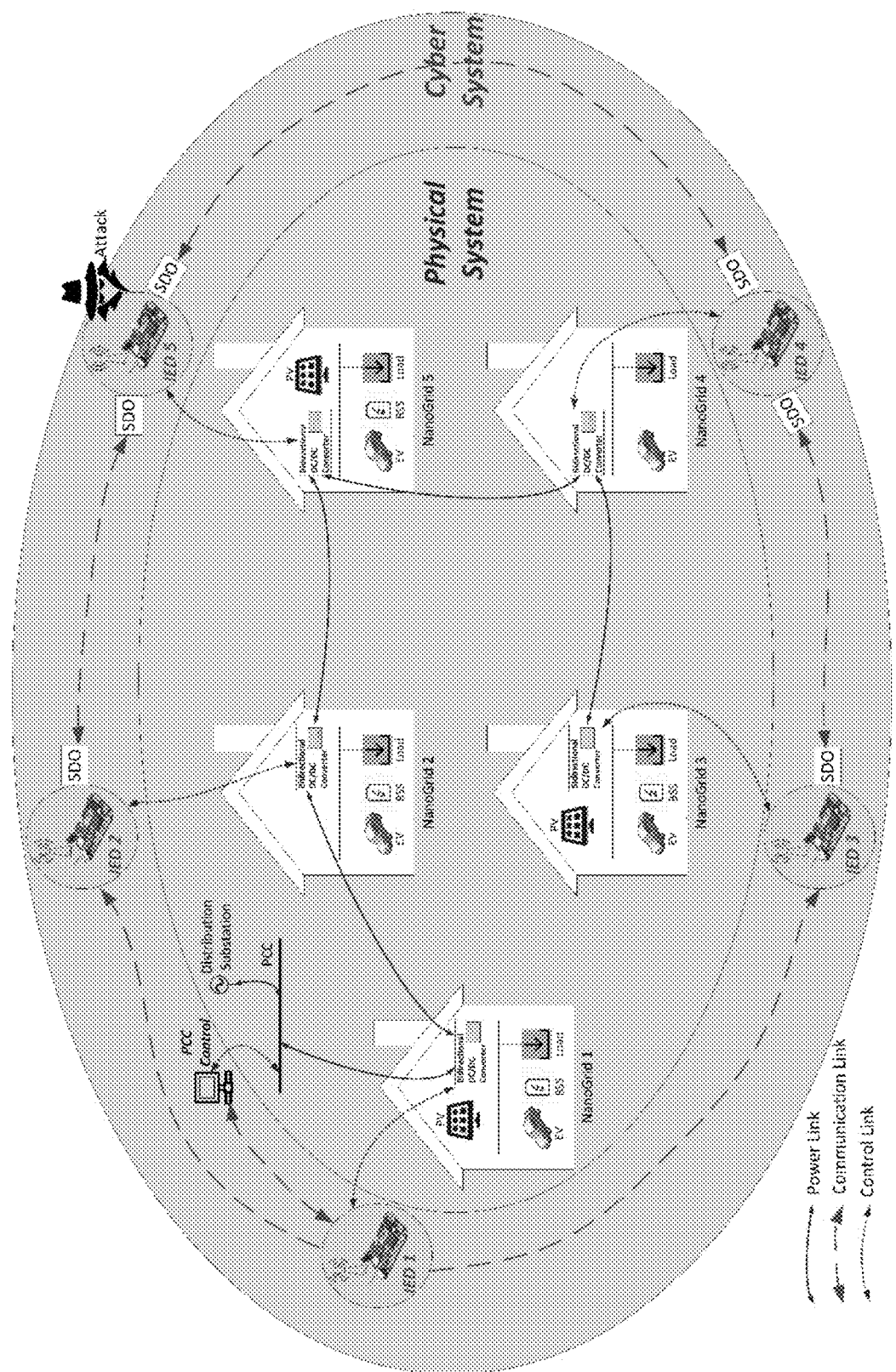
FIG. 7 shows an example of applying a security-aware distributed control/management system according to an embodiment of the subject invention on an interconnected nanogrid system.

Security-aware distributed control systems of embodiments of the subject invention can be utilized an interconnected nanogrids system. FIG. 7 shows an interconnected directed current (DC) nanogrids system. Each nanogrid is represented by a DC bus, which connects the nanogrid load, photovoltaic (PV) system, battery energy storage system, and electric vehicle charging slot. A bi-directional DC/DC converter is utilized to connect each DC nanogrid and its neighbors. The DC distribution grid system is connected to the distribution substation via the point of common coupling (PCC). The intelligent electronic device (IED) is a controller/optimizer that is working to achieve a global objective commanded by the PCC control center. An SDO of an embodiment of the subject invention can be implanted inside the IEDs to make the control system aware of the system security.

Figure 8:
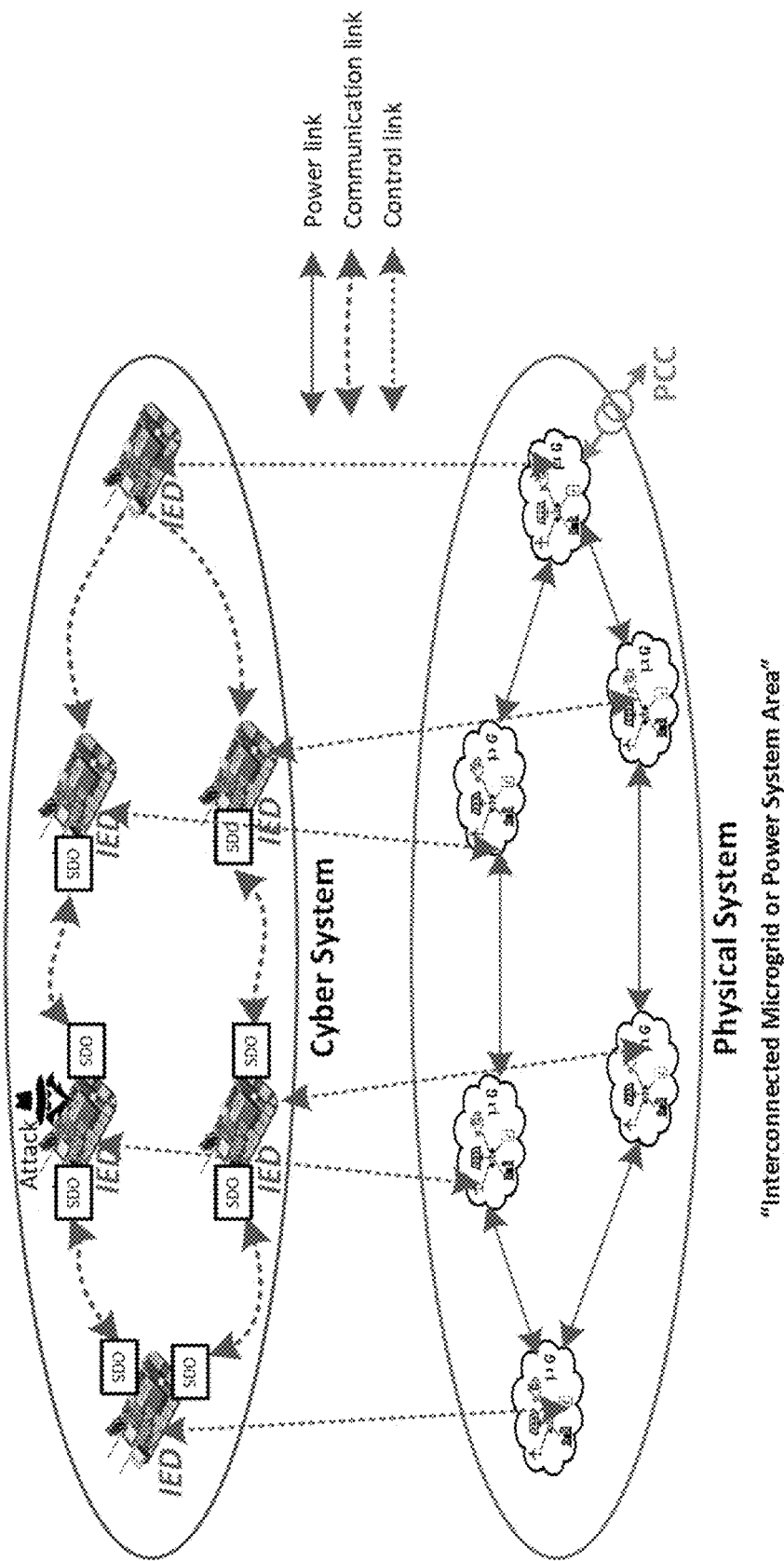
FIG. 8 shows an example of applying a security-aware distributed control/management system according to an embodiment of the subject invention on an interconnected microgrid system or interconnected power system areas.

A larger scale application of security-aware distributed control systems of embodiments of the subject invention is the interconnected microgrids system or power areas system that uses a distributed control/management system. The control/management objective can be maximizing the profit, maintaining the voltage stability, achieving large balancing area (load frequency control), or synchronizing a fleet of interconnected microgrids. FIG. 8 shows the interconnected microgrids system as a physical system that is controlled by the security aware DSC via the implementation of an SDO according to an embodiment of the subject invention on top of the secondary control algorithm.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Example 1

A security framework as disclosed herein was tested on five interconnected power systems. Each small power system had a control agent, where there was a main leader agent and four follower agents for the interconnected systems. Two agents were connected directly to the leader through a unidirectional communication link, and all the follower agents were connected through bidirectional communication links. All the agents were supposed to follow the leader to ensure a global power production objective. Each agent followed the sharing factor, coming from the leader, and generated a certain amount of power according to its maximum capability.

Figure 4:
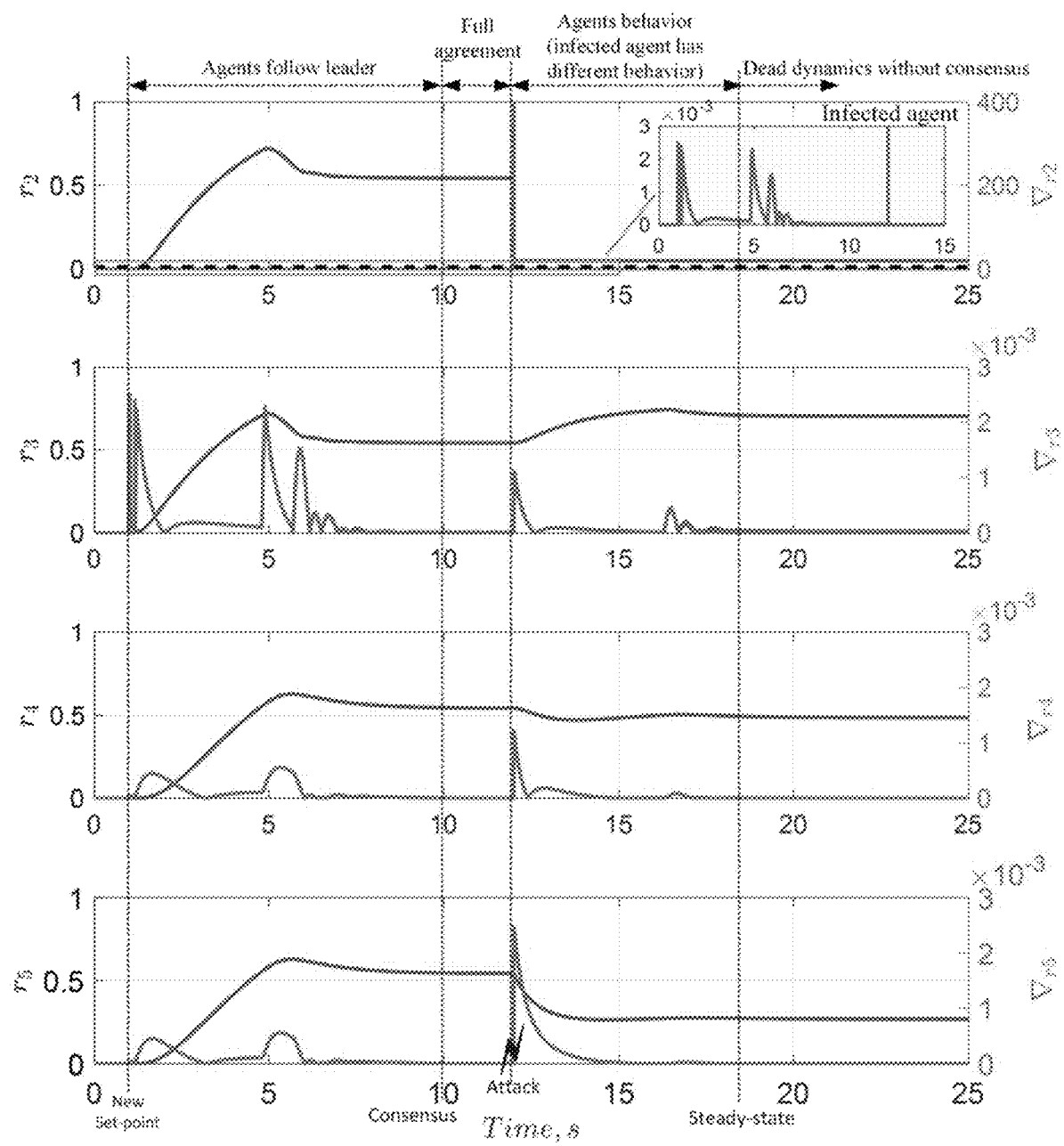
FIG. 4 shows plots of T and $\nabla r$ versus time (in seconds (s)) for four different values (from top to bottom, first plot is for $T_2$ and $\nabla r_2$; second plot is for $T_3$ and $\nabla r_3$; third plot is for $T_4$ and $\nabla r_4$; and fourth plot is for $T_5$ and $\nabla r_5$).

In this test, it was assumed that there was a false data injection attack on the second agent, where the agent is manipulated to transmit and follow an artificial sharing factor of $r_2=0.005$ at t=12 seconds. FIG. 4 shows that at t=1 second, all the agents started to ramp up until they reached the same sharing factor of 0.55 ($r_2=r_3=r_4=r_5=0.55$) at t=10 seconds. This happened because all the agents followed the reference sharing factor that was sent by the leader and reached consensus. During this period, the captured features were consistent, where agents 2 and 3 were similar and had comparable gradient values. Also, agents 4 and 5 were similar and had equal second resolution gradient values $\nabla_{r2}=\nabla_{r5}$. When the attack was launched on the second agent at t=12 seconds, the infected agent started to have its own dynamic features, as shown in FIG. 4.

Figure 5:
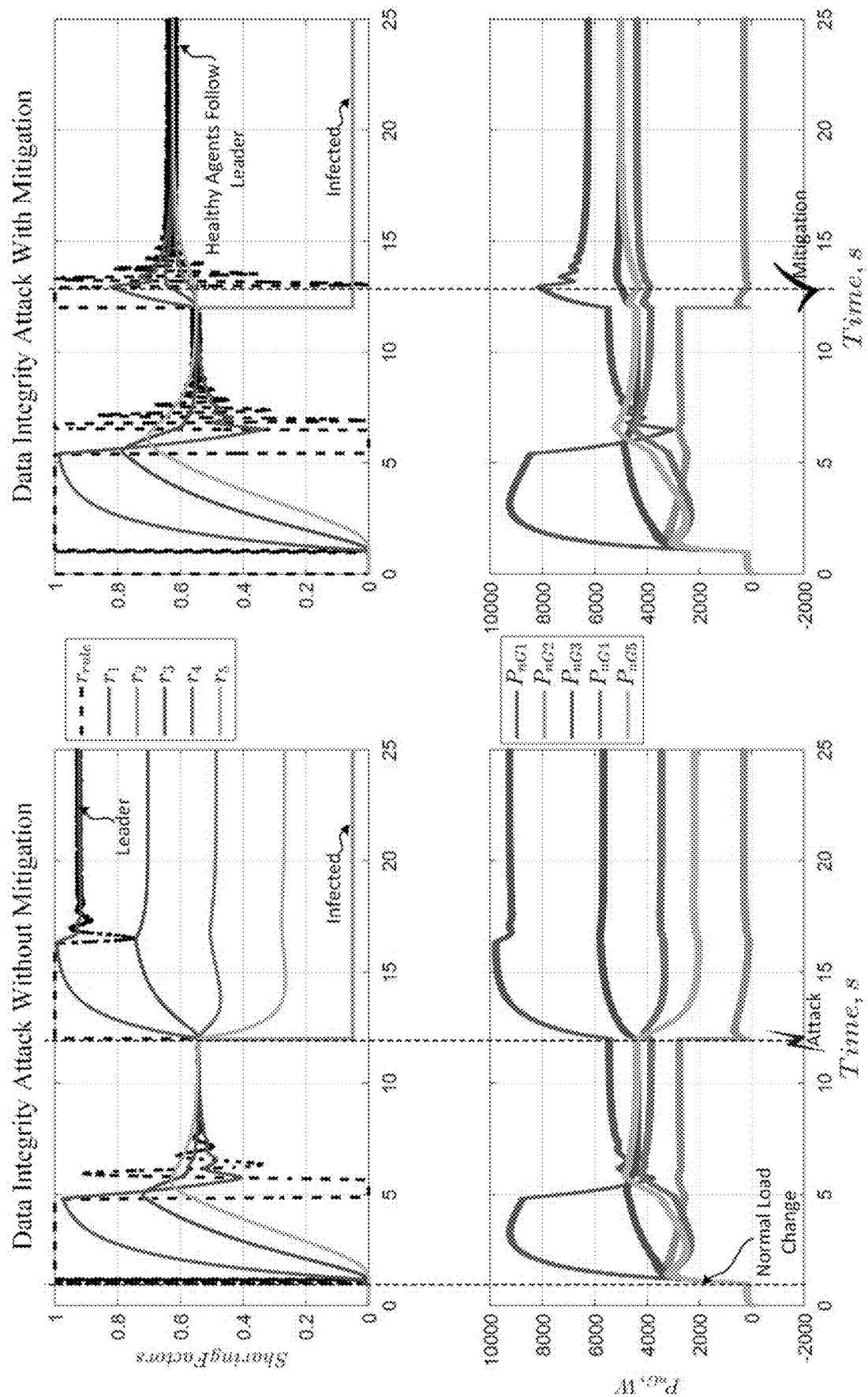
FIG. 5 shows plots of system response with and without a security-aware distributed control/management system according to an embodiment of the subject invention. The two plots in the left column are for system response without the security-aware distributed control/management system, and the two plots in the right column are for system response without the security-aware distributed control/management system. The top two plots are for sharing factors versus time (in s), and the bottom two plots are for $P_{nG}$ (in Watts (W)).

To show the performance of the framework, the sharing factors and the generated power by each of the five systems is shown in FIG. 5 with and without the proposed security framework. In the period t=1 to 10 seconds, a new normal reference was sent by the leader and all the agent followed the transmitted sharing factor, where the consensus had been achieved and the agents generated the required power. When the attack was launched on the second agent at t=12 sec, only the leader followed the control rule, while the rest of the agents could not reach a consensus. This is shown on the left-hand side of FIG. 5. In addition, the leader energy system participated at almost its maximum capability, while the infected ones practically did not share.

The right-hand side of FIG. 5 shows that the security framework was able to detect the changes in the dynamic behavior of the infected agent, and the mitigation mechanism was activated to isolate the infected agent 2 from the cyber system. This gave the opportunity to the healthy agents to avoid infection and be able to follow the leader and accomplish the consensus agreement. The power participation from each energy system conformed to the sharing factors decision, and the leader power reduced from 95% to 60%.

Example 2

A security framework as disclosed herein was tested for scalability. Although Example 1 shows a test on a system of only five interconnected power areas, the system can perform well in larger systems as well. This represents one of the main advantages of the frameworks of embodiments of the subject invention, as it has excellent scalability that can ensure its integration in all system regardless of the number of agents or interconnected systems. As the number of the interconnected system increases, the execution time to reach the consensus among all the agents also increases. However, the feasible execution time can be easily realized by using a high-performance computer that is available in the market.

Figures 6A, 6B, 6C:
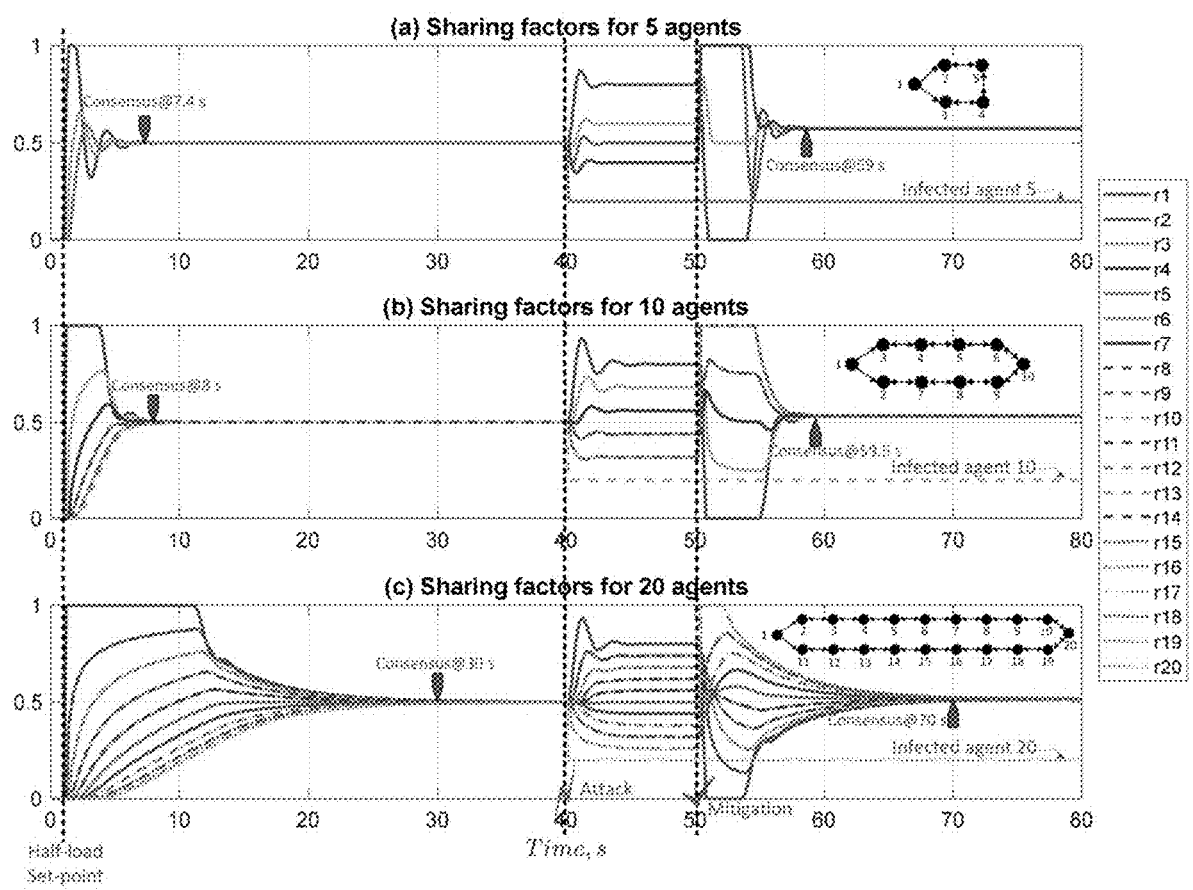
FIGS. 6(a)-6(c) show a scalability evaluation for a security-aware distributed control/management system according to an embodiment of the subject invention; each is plot of sharing factors versus time (in s).

To show the ability of the framework in ensuring the security of the system in different interconnected systems, it was tested in a system of 5, 10, and 20 interconnected power areas, and the results are shown in FIG. 6. In this test, a control rule was sent at t=1 second to supply the load of the system. It can be seen from FIG. 6 that the consensus was always achieved but took a longer time when the number of the interconnected systems was larger. It can be much faster if a high-performance computer is used.

At t=40 seconds, an inception attack was launched on agents r5, r10 and, r20 of the first, second, and third topology (5, 10, 20 interconnected systems), respectively. In all cases, the infected agent was detected and isolated, and an updated consensus was reached. This demonstrates the performance of the framework in a system with a small number of interconnected systems and in a system with a large number of interconnected systems.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A framework for providing security in a power system, the framework comprising:
   a hardware processor; and
   a machine-readable medium in operable communication with the hardware processor and having instructions stored thereon that, when executed by the hardware processor, perform the following steps:
   receive incoming information states from agents of the power system;
   analyze the incoming information states using a first level of a multi-resolution morphological gradient algorithm (MMGA);
   calculate a first resolution multi-resolution morphological gradient (MMG) based on the incoming information states;
   compare an absolute value of the first resolution MMG to a first threshold and, if the absolute value of the first resolution MMG exceeds the first threshold, trigger an attack alarm that the power system has an infected agent;
   if the attack alarm is triggered, calculate a second resolution MMG based on the incoming information states;
   compare an absolute value of the second resolution MMG to a second threshold to identify which of the agents of the power system is the infected agent;
   set all weighting factors of the infected agent to zero to exclude the infected agent from power system communication; and
   send an updated state to the agents of the power system with the infected agent excluded from the power system communication.

2. The framework according to claim 1, the analyzing of the incoming information states using the first level of the MMGA comprising:
   calculating dilation and erosion processes of the incoming information states by finding a maximum number of delayed samples and a minimum number of delayed samples of the incoming information states.

3. The framework according to claim 2, a quantity of the delayed samples being dependent upon a rate of information exchange between the agents of the power system.

4. The framework according to claim 2, the calculating of the dilation and erosion processes comprising using the following equations:

$$(f \oplus g)(k) = \max\{f(k+s) + g(s) \mid (k+s) \in D_f, s \in D_g\}$$

$$(f \ominus g)(k) = \min\{f(k+s) + g(s) \mid (k+s) \in D_f, s \in D_g\},$$

where f represents a signal of the incoming information states, g is a structuring element that lies in domains $D_f$, $D_g$, s is a sampling constant of the signal, and k is a sampling constant of the structuring element.

5. The framework according to claim 4, the calculating of the first resolution MMG comprising subtracting a dilated signal from an eroded signal.

6. The framework according to claim 5, the subtracting of the dilated signal from the eroded signal comprising using the following equation:

$$\nabla_i^w = (f \oplus g)^w - (f \ominus g)^w,$$

where w represents a resolution level.

7. The framework according to claim 2, the calculating of the first resolution MMG comprising subtracting a dilated signal from an eroded signal.

8. The framework according to claim 7, the subtracting of the dilated signal from the eroded signal comprising using the following equation:

$$\nabla_i^w = (f \oplus g)^w - (f \ominus g)^w,$$

where w represents a resolution level.

9. The framework according to claim 1, the calculating of the first resolution MMG comprising subtracting a dilated signal from an eroded signal.

10. The framework according to claim 9, the subtracting of the dilated signal from the eroded signal comprising using the following equation:

$$\nabla_i^w = (f \oplus g)^w - (f \ominus g)^w,$$

where w represents a resolution level.

11. The framework according to claim 1, the second threshold being greater than the first threshold.

12. The framework according to claim 1, the first threshold being based on a topology of a communication graph between the agents of the power system, and
   the second threshold being based on the topology of the communication graph between the agents of the power system.

13. The framework according to claim 1, the power system comprising at least one of a nanogrid, a microgrid, and a power system area.

14. The framework according to claim 1, the agents of the power system comprising at least 20 agents.

15. A method for providing security in a power system, the method comprising:
   receiving, by a hardware processor, incoming information states from agents of the power system;
   analyzing, by the hardware processor, the incoming information states using a first level of a multi-resolution morphological gradient algorithm (MMGA);
   calculating, by the hardware processor, a first resolution multi-resolution morphological gradient (MMG) based on the incoming information states;
   comparing, by the hardware processor, an absolute value of the first resolution MMG to a first threshold and, if the absolute value of the first resolution MMG exceeds the first threshold, trigger an attack alarm that the power system has an infected agent;
   if the attack alarm is triggered, calculating, by the hardware processor, a second resolution MMG based on the incoming information states;
   comparing, by the hardware processor, an absolute value of the second resolution MMG to a second threshold to identify which of the agents of the power system is the infected agent;
   setting, by the hardware processor, all weighting factors of the infected agent to zero to exclude the infected agent from power system communication; and
   sending, by the hardware processor, an updated state to the agents of the power system with the infected agent excluded from power system communication.

16. The method according to claim 15, the analyzing of the incoming information states using the first level of the MMGA comprising:

calculating dilation and erosion processes of the incoming information states by finding a maximum number of delayed samples and a minimum number of delayed samples of the incoming information states, the calculating of the dilation and erosion processes comprising using the following equations:

$$(f \oplus g)(k) = \max\{f(k+s) + g(s) \mid (k+s) \in D_f, s \in D_g\} \quad (6)$$

$$(f \ominus g)(k) = \min\{f(k+s) + g(s) \mid (k+s) \in D_f, s \in D_g\}, \quad (7)$$

where f represents a signal of the incoming information states, g is a structuring element that lies in domains $D_f$, $D_g$, s is a sampling constant of the signal, and k is a sampling constant of the structuring element.

17. The method according to claim 15, the calculating of the first resolution MMG comprising subtracting a dilated signal from an eroded signal, and the subtracting of the dilated signal from the eroded signal comprising using the following equation:

$$\nabla_i^w = (f \oplus g)^w - (f \ominus g)^w,$$

where w represents a resolution level.

18. The method according to claim 15, the second threshold being greater than the first threshold, the first threshold being based on a topology of a communication graph between the agents of the power system, and the second threshold being based on the topology of the communication graph between the agents of the power system.

19. The method according to claim 15, the power system comprising at least one of a nanogrid, a microgrid, and a power system area.

20. A framework for providing security in a power system, the framework comprising:

a hardware processor; and a machine-readable medium in operable communication with the hardware processor and having instructions stored thereon that, when executed by the hardware processor, perform the following steps:

receive incoming information states from agents of the power system;

analyze the incoming information states using a first level of a multi-resolution morphological gradient algorithm (MMGA);

calculate a first resolution multi-resolution morphological gradient (MMG) based on the incoming information states;

compare an absolute value of the first resolution MMG to a first threshold and, if the absolute value of the first resolution MMG exceeds the first threshold, trigger an attack alarm that the power system has an infected agent;

if the attack alarm is triggered, calculate a second resolution MMG based on the incoming information states;

compare an absolute value of the second resolution MMG to a second threshold to identify which of the agents of the power system is the infected agent;

set all weighting factors of the infected agent to zero to exclude the infected agent from power system communication; and sending an updated state to the agents of the power system with the infected agent excluded from power system communication, the analyzing of the incoming information states using the first level of the MMGA comprising calculating dilation and erosion processes of the incoming information states by finding a maximum number of delayed samples and a minimum number of delayed samples of the incoming information states, a quantity of the delayed samples being dependent upon a rate of information exchange between the agents of the power system, the calculating of the dilation and erosion processes comprising using the following equations:

$$(f \oplus g)(k) = \max\{f(k+s) + g(s) \mid (k+s) \in D_f, s \in D_g\}$$

$$(f \ominus g)(k) = \min\{f(k+s) + g(s) \mid (k+s) \in D_f, s \in D_g\},$$

where f represents a signal of the incoming information states, g is a structuring element that lies in domains $D_f$, $D_g$, s is a sampling constant of the signal, and k is a sampling constant of the structuring element, the calculating of the first resolution MMG comprising subtracting a dilated signal from an eroded signal, the subtracting of the dilated signal from the eroded signal comprising using the following equation:

$$\nabla_i^w = (f \oplus g)^w - (f \ominus g)^w,$$

where w represents a resolution level, the second threshold being greater than the first threshold, the first threshold being based on a topology of a communication graph between the agents of the power system, the second threshold being based on the topology of the communication graph between the agents of the power system, the power system comprising at least one of a nanogrid, a microgrid, and a power system area, and the agents of the power system comprising at least 20 agents.

* * * * *